United States Patent
Wang et al.

(10) Patent No.: US 11,040,397 B2
(45) Date of Patent: Jun. 22, 2021

(54) METHOD OF HIGH-THROUGHPUT HOT ISOSTATIC PRESSING MICRO-SYNTHESIS FOR THE COMBINATORIAL MATERIALS AND SLEEVE MOULD THEREOF

(71) Applicant: CENTRAL IRON AND STEEL RESEARCH INSTITUTE, Beijing (CN)

(72) Inventors: Haizhou Wang, Beijing (CN); Yunhai Jia, Beijing (CN); Lei Zhao, Beijing (CN); Xuebin Chen, Beijing (CN); Hui Wang, Beijing (CN); Man Hu, Beijing (CN); Guang Feng, Beijing (CN); Dongling Li, Beijing (CN); Peng Wang, Beijing (CN); Xiaojia Li, Beijing (CN)

(73) Assignee: CENTRAL IRON AND STEEL RESEARCH INSTITUTE, Beijing (CN)

( * ) Notice: Subject to any disclaimer, the term of this patent is extended or adjusted under 35 U.S.C. 154(b) by 0 days.

(21) Appl. No.: 16/736,554

(22) Filed: Jan. 7, 2020

(65) Prior Publication Data

US 2020/0215613 A1 Jul. 9, 2020

(30) Foreign Application Priority Data

Jan. 8, 2019 (CN) .......................... 201910014812.4

(51) Int. Cl.
*B22F 3/15* (2006.01)
*B33Y 80/00* (2015.01)

(52) U.S. Cl.
CPC ............... *B22F 3/15* (2013.01); *B33Y 80/00* (2014.12); *B22F 2003/153* (2013.01)

(58) Field of Classification Search
CPC .............................. B22F 3/15; B22F 2003/153
See application file for complete search history.

(56) References Cited

U.S. PATENT DOCUMENTS 3,728,111 A * 4/1973 Stromblad ................ B22F 3/15
419/42
5,082,710 A * 1/1992 Wright ................ C04B 35/6455
428/220

(Continued)

FOREIGN PATENT DOCUMENTS

CN        1852874 A      10/2006
CN      101391302 A       3/2009

(Continued)

*Primary Examiner* — Anthony J Zimmer
*Assistant Examiner* — Ricardo D Morales
(74) *Attorney, Agent, or Firm* — Muncy, Geissler, Olds and Lowe, P.C.

(57) ABSTRACT

A sleeve mold for a method of high-throughput hot isostatic pressing micro-synthesis for combinatorial materials includes a honeycomb-array-sleeve and an upper cover, wherein a plurality of single cells are tightly arranged inside the honeycomb-array-sleeve, an exhaust tube is arranged on the upper cover, after the single cells are filled with powder materials, the upper cover is sealed welding on the honeycomb-array-sleeve, and the honeycomb-array-sleeve and the upper cover are both integrally produced by additive manufacturing. According to the method and the sleeve mold, the powder metallurgy hot isostatic pressing process is utilized to prepare small-size bulk combinatorial materials with multiple discrete components rapidly at one time.

6 Claims, 3 Drawing Sheets

(56) References Cited

U.S. PATENT DOCUMENTS

2011/0142709 A1* 6/2011 Voice .................. B22F 3/12
                                                        419/28
2018/0361479 A1* 12/2018 Tozzi .................. B22F 3/15

FOREIGN PATENT DOCUMENTS

| CN | 107502765 A | 12/2017 |
| CN | 108254232 A | 7/2018 |
| EP | 1604760 A1 | 12/2005 |

* cited by examiner

METHOD OF HIGH-THROUGHPUT HOT ISOSTATIC PRESSING MICRO-SYNTHESIS FOR THE COMBINATORIAL MATERIALS AND SLEEVE MOULD THEREOF

TECHNICAL FIELD

The present invention belongs to the technical field of high-throughput preparation of materials, and relates to a method of high-throughput hot isostatic pressing micro-synthesis for the combinatorial materials and a sleeve mould thereof.

BACKGROUND ART

A traditional development and research method of new materials can be summarized as a "trial and error method". Firstly, based on existing theories or experiences, ratios of components of a target material is predicted or selected, and then the target material is prepared and processed in limited quantities (dozens of kilograms of general metal materials are needed), then components are adjusted and optimized according to characterization results of prepared samples for preparation and characterization again, after multiple cycles, a material satisfying requirements is obtained finally. The trial and error method of discrete sample preparation in which only one sample is prepared during one experiment is low in efficiency and high in research and development costs. According to statistics, the research and development of new materials worldwide needs 5-12 years in average, becoming a bottleneck in the development of modern new materials (Introduction to Materials Genome Initiative, Nature, 2014, 36(2): 89-104).

The existing preparation method of materials (especially preparation techniques of bulk materials) is generally aiming at a certain material system, a sample with one component is prepared at one time, the preparation efficiency is low, and the preparation cost is high. The main reason is the existence of the following two major defects:

1. The prepared material is unitary in combinations of components. Components of a material play a dominant role in its property. With a smelting preparation method of a metal material as an example, as to the existing method, only one combination manner of components can be selected at one time for batching and smelting, thereby greatly reducing efficiency in determining an optimal component combination ratio.

2. A huge material consumption for preparing a monomer sample leads to a higher cost. For trial manufacturing of new materials in limited quantities in a research and development stage, to a certain degree, the consumption of monomer samples is also huge, for example, the monomer mass under trial manufacturing of metal materials is also generally dozens of kilograms, and multiple repeated experiments are required, and this is the major reason of high cost.

A hot isostatic pressing process is to perform sintering and densification molding on products under a simultaneous effect of high temperature and high pressure, is an important means of powder metallurgy, and is also an important process of diffusion welding of different alloy surfaces. The hot isostatic pressing process has the characteristics of high sintering speed, high compaction density, good thermal diffusivity, short production cycle and low material consumption.

High-throughput synthesis of materials is a significant part of material genome initiative, and its task is to at one time manufacture material microchips with hundreds of combinations within a short time. Different characterization methods are then adopted to fast screen combination manners satisfying target requirements, with a core concept of changing a sequential iterative method adopted in traditional material research to a parallel processing method, so as to give rise to a qualitative change of material research efficiency from a quantitative change (Wang Haizhou, Wang Hong, Ding Hong, Xiang Xiaodong, Xiang Yong, Zhang Xiaokun: High-throughput Preparation and Characterization Technique of Materials [J]. Tech. Review, 2015, 33 (10): 31-49). However, up to date, there's still no report on the adoption of a hot isostatic pressing process to simultaneously perform sintering and diffusion alloying on different metal powders, and it has been not reported on the high-throughput manufacturing method in which small-size bulk combinatorial materials with multiple different components can be prepared at one time.

SUMMARY OF THE INVENTION

An object of the present invention is to provide a method of high-throughput hot isostatic pressing micro-synthesis for the combinatorial materials based on a powder metallurgy hot isostatic pressing process and metal diffusion principles.

Another object of the present invention is to provide a sleeve mould which can realize the above high-throughput micro-manufacturing method. Multiple single cells are arranged in a honeycomb-array-sleeve to isolate metal powders of different components, and to perform high-throughput synthesis on samples of small-size bulk combinatorial materials with multiple components (a dozen grams to dozens of grams of monomer samples) at one time.

To achieve the above objective, the present invention provides the following technical solution:

A method of high-throughput hot isostatic pressing micro-synthesis for the combinatorial materials is provided, wherein the method is a powder metallurgy high-throughput preparation method of multi-component materials at one time, specifically including the following steps:

1) powder preparation and sleeve manufacturing:

weighing a series of basic material powder of a specified mass and to-be-added element or component powder, and mixing uniformly according to a designed mixture ratio, to prepare mixture powder series with different combinations of components;

integrally printing and forming a sleeve mould 2 by additive manufacturing manner; wherein the sleeve mould 2 includes a honeycomb-array-sleeve 3 and an upper cover 4, a plurality of single honeycomb cells 6 are tightly arranged inside the honeycomb-array-sleeve 3, and an exhaust tube 5 is arranged on the upper cover 4;

2) powder filling and degassing:

uniformly and densely filling a mixture powder series with different combinations of components respectively into each single cell 6 of the honeycomb-array-sleeve 3; sealing and welding the upper cover 4 on the honeycomb-array-sleeve 3; and degassing through the exhaust tube 5 at a limiting temperature, and closing the exhaust tube 5 for leakage detection;

3) hot isostatic pressure processing:

placing the sleeve mould 2 obtained in step 2) in a hot isostatic press apparatus 1, and performing densification molding and thermal diffusion according to a preset temperature, pressure and time other process parameters; taking out the sleeve mould 2 and stripping off an outer sleeve, to obtain a bulk combinatorial materials with different components, and to be used in follow-up analysis and characterization.

In step 2), an exhaust tube 5 is adopted to vacuumize to $1\times10^{-5}$-$1\times10^{-4}$ Pa at 20-40° C., vacuum is maintained and heated up to 500-600° C., the exhaust tube 5 is adopted to continuously vacuumize for 4-6 hours, degassing is performed, air and moisture in a sleeve mould 2 are removed, and then the exhaust tube 5 is closed.

In step 3), according to differences in prepared materials, hot isostatic pressing is performed for 5-10 hours at a temperature of 500-1400° C. and a pressure of 120-200 MPa.

A sample manufactured through the method has a size of 10-50 mm and a mass of 200-1000 g.

A sleeve mould use for the method of high-throughput hot isostatic pressing micro-synthesis for the combinatorial materials is provided, wherein the sleeve mould 2 includes a honeycomb-array-sleeve 3 and an upper cover 4, a plurality of single cells 6 are tightly arranged inside the honeycomb-array-sleeve 3, an exhaust tube 5 is arranged on the upper cover 4, after the single cells 6 are filled with powder materials, the upper cover 4 is sealed on the honeycomb-array-sleeve 3, and the honeycomb-array-sleeve 3 and the upper cover 4 are both integrally produced by additive manufacturing manner.

A cross section of the single cell 6 is a regular hexagon.

The material of the honeycomb-array-sleeve 3 is a metal with a melting point being higher than that of the prepared powder material series with different combinations of components.

An inner wall of each single cell 6 of the honeycomb-array-sleeve 3 is boron nitride sprayed with high-temperature-resistant coating.

A wall thickness of the single cell 6 is less than 0.5 mm.

Compared with the prior art, the present invention has the following beneficial effects:

1. In the present invention, under a simultaneous effect of high temperature and high pressure, different metal powders are sintered and mutually diffused to realize metallurgical bonding. The method in the present invention has the characteristics of high sintering speed, high compaction density, good thermal diffusivity, short production cycle and low material consumption, can realize rapid preparation of a small-size bulk combinatorial material with multiple discrete components at one time, and solves the problems of unitary combination of components of prepared materials, huge material consumption of prepared samples and high cost in the existing material preparation method.

2. The material samples prepared in the present invention have multiple components, and material samples with multiple combinations of components can be prepared at one time, thereby greatly improving efficiency in screening an optimal component combination ratio.

3. The material consumption in monomer samples prepared in the present invention is low. Batch metal samples synthesized in the present invention are small in monomer size (several millimeters) and small in mass (a dozen to dozens of grams), therefore, the material consumption is also low. Metal samples of this size can not only truly reflect various performances of structural materials, but also save a lot of costs, and compared with conventional experimental-level trial manufacturing, the material consumption is at least lowered by 100 times.

Figure 1:
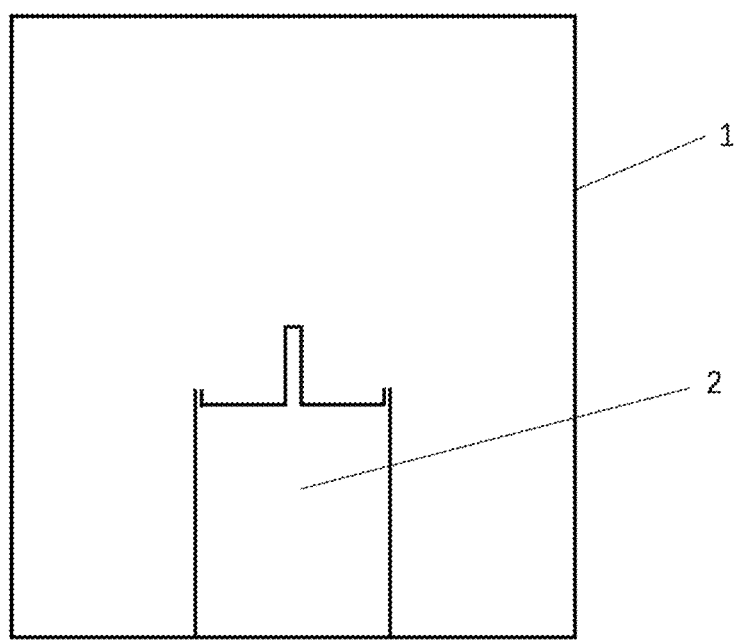
FIG. 1 is a schematic diagram of a use state of a sleeve mould 2 in a hot isostatic press apparatus 1 in the present invention.

reference numerals in the figures:

| 1 | hot isostatic press apparatus | 2 | sleeve mould |
| 3 | honeycomb-array-sleeve | 4 | upper cover |
| 5 | exhaust tube | 6 | single honeycomb cell |

DETAILED DESCRIPTION OF THE EMBODIMENTS

The present invention will be further described below in combination with accompanying drawings and embodiments.

The method of high-throughput hot isostatic pressing micro-synthesis for the combinatorial materials in the present invention includes the following steps:

step 1: weighing a series of basic material powder of a specified mass and to-be-added element or component powder, and mixing uniformly according to a certain designed mixture ratio, to prepare mixture powder series with different combinations of components; and integrally producing a sleeve mould 2 by additive manufacturing;

step 2: uniformly and densely filling a mixture powder series with different combinations of components respectively into each single cell 6 of a honeycomb-array-sleeve 3 of a sleeve mould 2;

step 3: sealing and welding an upper cover 4 provided with an exhaust tube 5 on the honeycomb-array-sleeve 3;

step 4: degassing the sleeve mould 2 through the exhaust tube 5 at a limiting temperature, and closing the exhaust tube 5 for leakage detection;

step 5: placing a sleeve mould 2 in a hot isostatic press apparatus 1, as shown in FIG. 1, and performing densification molding and thermal diffusion according to a preset temperature, pressure and time and other process parameters; and step 6: taking out the sleeve mould 2 and stripping off an outer sleeve, to obtain a bulk combinatorial materials with different components, and to be used in follow-up analysis and characterization.

Preferably, the mixture powder series with different combinations of components are mixed metal powder of multiple components.

Figure 2:
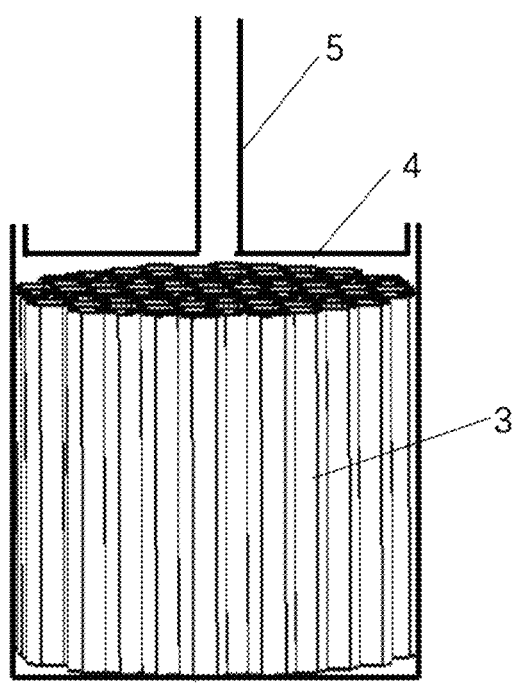
FIG. 2 is a structural schematic diagram of a sleeve mould 2 of the present invention.
Figure 3:
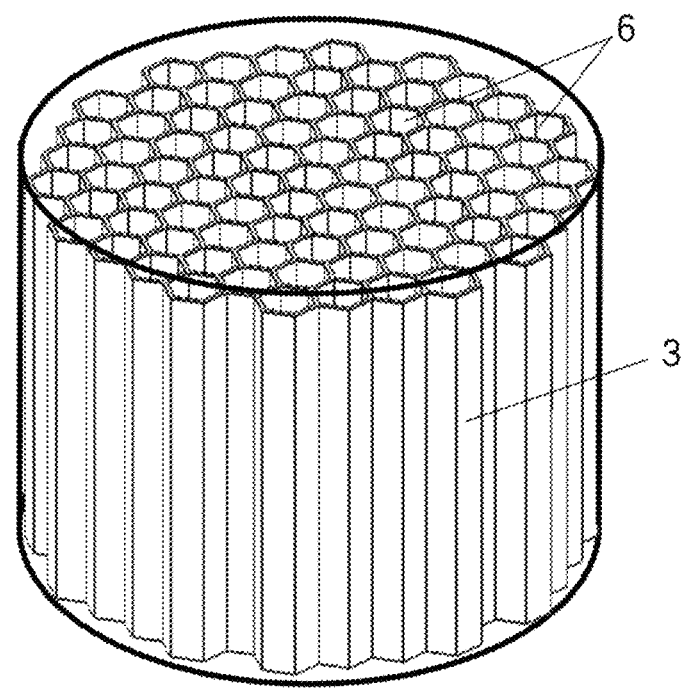
FIG. 3 is a three-dimensional structural schematic diagram of a honeycomb-array-sleeve 3 in the present invention.

As shown in FIG. 2 and FIG. 3, the sleeve mould 2 includes the honeycomb-array-sleeve 3 and the upper cover 4, a plurality of single cells 6 are tightly arranged inside the honeycomb-array-sleeve 3, to isolate metal powders of different components; and a cross section of the single cell 6 is a regular hexagon. An exhaust tube 5 is arranged on the upper cover 4. The honeycomb-array-sleeve 3 and the upper cover 4 are both integrally produced by additive manufacturing.

Preferably, the material of the honeycomb-array-sleeve 3 is a metal with a melting point being higher than that of the prepared mixture powder series with different combinations of components.

Preferably, an inner wall of each single honeycomb cell 6 of the honeycomb-array-sleeve 3 is sprayed with boron nitride high-temperature-resistant coating, to prevent diffusion with powder materials with different combinations of components.

Preferably, a wall thickness of the single cell 6 is less than 0.5 mm, to facilitate temperature conduction and equilibrium of the honeycomb-array-sleeve 3 and compaction densification of the honeycomb-array-sleeve 3.

Embodiment

In the present embodiment, a hot isostatic pressing high-throughput micro-synthesis method for bulk materials with multiple combinations of components is described with a ternary alloy of iron, cobalt and nickel as an example. Specific steps of the present embodiment are as follows:

step 1: respectively weighing iron, cobalt and nickel powder with 19 different component ratios, wherein a total mass of each part is 100 g, a mass ratio of iron, cobalt and nickel powder is specified in the following table, and the iron, cobalt and nickel powder is respectively mechanically mixed uniformly, to prepare a mixture powder series with 19 combinations of components;

| Mass ratio of 19 components of iron, cobalt and nickel powder | | | | |
|---|---|---|---|---|
| Fe | Co | Ni | Fe:Co:Ni | |
| Fe:Co | 3Fe:Co | 6Fe:Co | Fe:6Co | Fe:3Co |
| Co:Ni | 3Co:Ni | 6Co:Ni | Co:6Ni | Co:3Ni |
| Fe:Ni | 3Fe:Ni | 6Fe:Ni | Fe:6Ni | Fe:3Ni | step 2: uniformly and densely filling the powder basic metal series with 19 combinations of components into each single cell 6 of the honeycomb-array-sleeve 3;

step 3: sealing and welding the upper cover 4 and the exhaust tube 5 on the honeycomb-array-sleeve 3, to prepare a sleeve mould 2;

step 4: vacuumizing through the exhaust tube 5 to $1\times10^{-4}$ Pa at 25° C., maintaining vacuum and heating up to 500° C., continuously vacuumizing for 4 hours through the exhaust tube 5, degassing, removing air and moisture in the sleeve mould 2, and then closing the exhaust tube 5, and detecting leakage of the sleeve mould 2, wherein the sleeve mould 2 is sealed well; P step 5: placing the sleeve mould 2 in a hot isostatic press apparatus 1, and performing hot isostatic pressing diffusion for 10 hours at a target temperature of 1050° C. and a pressure of 120 MPa for moulding; and step 6: cooling to room temperature, taking out the sleeve mould 2 and stripping off an outer sleeve, to obtain a bulk combinatorial material, and to be used in follow-up analysis and characterization.

The invention claimed is:

1. A method of high-throughput hot isostatic pressing micro-synthesis for the combinatorial materials, wherein the method is a powder metallurgy high-throughput preparation method of multi-component materials at one time, comprising:

weighing a series of basic material powder of a specified mass and to-be-added elements or component powder, and mixing uniformly according to a designed mixture ratio, to prepare mixture powder series with different combinations of components;

integrally printing and forming a sleeve mold by additive manufacturing manner; wherein the sleeve mold comprises:

a honeycomb-array-sleeve;

an upper cover;

a plurality of single cells tightly arranged inside the honeycomb-array-sleeve, a cross section of the single cell is a regular hexagon, the material of the honey-comb-array-sleeve is a metal with a melting point being higher than that of the prepared powder material series with different combinations of components; and an exhaust tube i-s-arranged on the upper cover;

uniformly and densely filling a mixture powder series with different combinations of components respectively into each single cell of the honeycomb-array-sleeve; sealing and welding the upper cover on the honeycomb-array-sleeve; and degassing through the exhaust tube at a limiting temperature, and closing the exhaust tube for leakage detection;

placing the sleeve mold in a hot isostatic press apparatus, and performing a hot isostatic press process, to realize densification molding and thermal diffusion of the powder materials with different composition combinations according to a preset temperature, pressure and time and other process parameters; and taking out the sleeve mold and stripping off an outer sleeve, to obtain a bulk combinatorial materials with different components, and to be used in follow-up analysis and characterization.

2. The method of high-throughput hot isostatic pressing micro-synthesis for the combinatorial materials of claim 1, wherein during said uniformly and densely filling a mixture powder series, the exhaust tube is vacuumized to $1\times10^{-5}$-$1\times10^{-4}$ Pa at 20-40° C., vacuum is maintained and heated up to 500-600° C., the exhaust tube is continuously vacuumized for 4-6 hours, degassing is performed, air and moisture in the sleeve mold are removed, and then the exhaust tube is closed.

3. The method of high-throughput hot isostatic pressing micro-synthesis for the combinatorial materials of claim 1, wherein during said performing the hot isostatic press process, according to differences in prepared materials, the hot isostatic pressing is performed for 5-10 hours at a temperature of 500-1400° C. and a pressure of 120-200 MPa.

4. A sleeve mold used for the method of high-throughput hot isostatic pressing micro-synthesis for the combinatorial materials of claim 1, wherein the sleeve mold comprises:

the honeycomb-array-sleeve;

the upper cover;

the plurality of single cells tightly arranged inside the honeycomb-array-sleeve; and the exhaust tube arranged on the upper cover, after the single cells are filled with powder materials, the upper cover is sealed welding on the honeycomb-array-sleeve, and the honeycomb-array-sleeve and the upper cover are both integrally produced by additive manufacturing manner.

5. The sleeve mold of claim 4, wherein an inner wall of each single cell of the honeycomb-array-sleeve is sprayed with boron nitride high-temperature-resistant coating.

6. The sleeve mold of claim 4, wherein a wall thickness of the single cell is less than 0.5 mm.

* * * * *